United States Patent
Dong et al.

(10) Patent No.: US 9,358,770 B2
(45) Date of Patent: Jun. 7, 2016

(54) SYSTEM AND METHOD FOR AUTOMATED INITIAL SEPARATION OF COMPOSITE PLY BACKING

(71) Applicant: The Boeing Company, Seal Beach, CA (US)

(72) Inventors: Shuonan Dong, Newcastle, WA (US); Byungwoo Lee, Kirkland, WA (US); David J Heiser, Seattle, WA (US); Miles Stefanovski, Crown Point, IN (US); Matthew J O'Brien, Lake Stevens, WA (US); Kevin S Callahan, Shoreline, WA (US); Derek J Flolid, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/265,577

(22) Filed: Apr. 30, 2014

(65) Prior Publication Data

US 2015/0314584 A1    Nov. 5, 2015

(51) Int. Cl.
*B32B 38/10*    (2006.01)
*B32B 43/00*    (2006.01)

(52) U.S. Cl.
CPC ............... *B32B 43/006* (2013.01); *B32B 38/10* (2013.01); *Y10T 156/11* (2015.01); *Y10T 156/1137* (2015.01); *Y10T 156/1142* (2015.01); *Y10T 156/1179* (2015.01); *Y10T 156/1195* (2015.01); *Y10T 156/19* (2015.01); *Y10T 156/1939* (2015.01); *Y10T 156/1978* (2015.01); *Y10T 156/1983* (2015.01); *Y10T 156/1994* (2015.01)

(58) Field of Classification Search
CPC .... B32B 38/10; B32B 43/006; Y10T 156/11; Y10T 156/1137; Y10T 156/1142; Y10T 156/1179; Y10T 156/1195; Y10T 156/19; Y10T 156/1939; Y10T 156/1983; Y10T 156/1994
USPC ......... 156/701, 708, 709, 716, 719, 750, 757, 156/765, 767
See application file for complete search history.

(56) References Cited

U.S. PATENT DOCUMENTS

| | | | | |
|---|---|---|---|---|
| 4,259,144 A * | 3/1981 | Ballentine | ............. | B29C 70/388 156/522 |
| 5,066,352 A * | 11/1991 | Albers | ............. | B26F 1/38 156/264 |
| 5,397,415 A * | 3/1995 | Manabe | ............. | B62D 3/08 156/234 |
| 5,466,330 A * | 11/1995 | Sakai | ............. | B29C 63/0013 156/247 |
| 5,482,589 A * | 1/1996 | Shin | ............. | B26D 7/18 156/265 |
| 5,861,077 A * | 1/1999 | Kamijo | ............. | B65C 9/0006 156/249 |
| 6,860,957 B2 * | 3/2005 | Sana | ............. | B29C 70/386 156/245 |
| 6,938,318 B2 * | 9/2005 | Yotsumoto | ............. | B09B 3/0058 156/760 |
| 8,012,291 B2 | 9/2011 | Kisch et al. | | |
| 8,029,642 B2 | 10/2011 | Hagman | | |
| 8,127,819 B2 * | 3/2012 | Tillement | ............. | B29C 70/388 156/247 |
| 8,464,773 B2 | 6/2013 | Hagman | | |
| 8,528,618 B2 | 9/2013 | Kisch et al. | | |
| 2008/0289746 A1 * | 11/2008 | Pfitzner | ............. | B65H 18/103 156/193 |
| 2009/0025875 A1 * | 1/2009 | Hagman | ............. | B32B 43/006 156/711 |
| 2010/0108265 A1 * | 5/2010 | Tillement | ............. | B65H 23/26 156/389 |
| 2014/0034246 A1 * | 2/2014 | Kenney | ............. | B32B 43/006 156/705 |

* cited by examiner

*Primary Examiner* — Mark A Osele
*Assistant Examiner* — Nickolas Harm
(74) *Attorney, Agent, or Firm* — Parsons Behle & Latimer (57) ABSTRACT

A method for initial separation of an adhered backing film from an uncured pre-impregnated composite lamina having an edge includes exposing and supporting the edge of the composite lamina, and applying an impact force to the exposed edge with an automated tool. The impact force is sufficient to cause delamination of the backing film from the composite lamina without damaging the lamina.

18 Claims, 7 Drawing Sheets

SYSTEM AND METHOD FOR AUTOMATED INITIAL SEPARATION OF COMPOSITE PLY BACKING

FIELD OF THE DISCLOSURE

The present disclosure relates to systems and methods for the use of composite materials such as carbon fiber composites. More particularly, the present disclosure relates to an apparatus and method for initially separating backing from plies of composite material through local mechanical deformation.

BACKGROUND

Thermoset pre-impregnated ("pre-preg") composite materials are typically supplied in rolls of uncured material of a single ply thickness having an adhered poly film layer or "backing paper" on one side of the composite ply to prevent layer-to-layer sticking within the roll during storage. Once the roll is unwound and spread on a cutting machine, the single ply of uncured composite material is cut into pieces of various shapes, which are then layered together and heat-cured in an autoclave or the like while held in contact with forms, etc. to produce a cured composite laminated part of a desired shape, size and thickness.

After cutting and prior to use, the backing paper on the individual ply is removed. Notably, full automation of the backing paper removal process has been found to be difficult. While removing backing paper is relatively straightforward once a corner or edge of the paper is separated, automation of the initial paper separation step has been found to be a challenge. Heretofore, the initial separation of the backing paper has typically been done by hand for both continuous fiber placement and pre-cut plies.

Additionally, it is desirable that backing paper removal be performed without damaging or contaminating the ply. Manual backing paper removal can be both time consuming and may increase the likelihood of damage and contamination of the composite ply. Accordingly, for full automation of handling and placement of composite plies it is desirable to automate the step of initial separation of the backing paper.

The present disclosure is directed toward one or more of the above issues.

SUMMARY

In accordance with one aspect thereof, the present disclosure provides a method for initial separation of an adhered backing film from a pre-impregnated composite lamina having an edge. The method includes exposing and supporting the edge of the composite lamina, and applying an impact force to the exposed edge with an automated tool. The impact force is sufficient to cause delamination of the backing film from the composite lamina without damaging the lamina.

In accordance with another aspect thereof, the present disclosure provides a method for separation of an adhered backing film from a pre-impregnated composite lamina. The method includes inserting a pre-impregnated composite lamina having a backing film within an automated removal device having an edge, and supporting the composite lamina in the removal device with a free edge of the composite lamina exposed and overhanging the edge of the removal device. The method further includes activating the removal device to impose a unidirectional or bidirectional impact force to the exposed edge of the composite lamina. The impact force is sufficient to deflect the exposed edge and cause delamination of an edge portion of the backing film from the composite lamina without damaging the lamina.

In accordance with yet another aspect thereof, the present disclosure provides a system for initial separation of an adhered backing film from a pre-impregnated composite lamina. The system includes a support structure for the composite lamina, the support structure having an edge, an automated mechanical impactor, disposed near the edge of the support structure, and a controller, coupled to the mechanical impactor. The automated mechanical impactor is adapted to apply a mechanical impact to an exposed edge of the composite lamina overhanging the edge of the support structure. The controller is configured to control a frequency, duration, and location of contact of the mechanical impactor along the exposed edge, whereby the impact force causes initial delamination of the backing film near the exposed edge of the composite lamina without damaging the lamina.

BRIEF DESCRIPTION OF THE DRAWINGS

Additional features and advantages of the invention will be apparent from the detailed description which follows, taken in conjunction with the accompanying drawings, which together illustrate, by way of example, features of the invention.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

As noted above, the initial separation of the backing paper of uncured thermoset pre-impregnated ("pre-preg") composite materials is typically done by hand for both continuous fiber placement and pre-cut plies. However, manual backing paper removal can be time-consuming and can expose the composite lamina to damage and contamination. Automating this initial separation would enable total automation of the placement of the ply. As used herein, the term "lamina" refers to the combination of a single ply of pre-preg composite material and its adhered backing paper.

Figure 1:
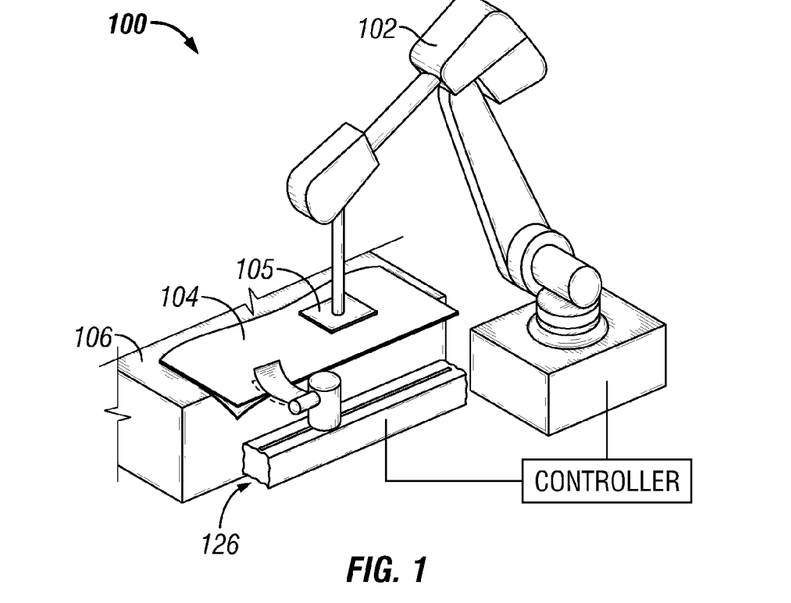
FIG. 1 is a perspective view of an embodiment of an automated handling and initial backing removal device for pre-impregnated composite materials.

Advantageously, a system and method for the automated initial separation of a backing film layer from pre-impregnated composite material is disclosed herein. In general, local mechanical deformation of an exposed edge of the composite lamina is accomplished by various mechanical devices to initiate backing film separation from the edge of the base composite material. Shown in FIG. 1 is a perspective view of an automated handling device 100 and initial backing removal device, indicated generally at 126, for pre-impregnated composite materials. The automated handling device 100 generally includes a robotic arm 102 that is configured to move cut pieces 104 of uncured composite material from a cutting machine (not shown) to a position at the initial backing removal device 126. The robotic arm 102 and the backing removal device 126 can both be controlled by a computer controller 116.

Uncured composite material is typically supplied in large rolls (not shown), which include a single ply of composite material, with an adhered poly film layer or "backing paper" on one side of the composite ply to prevent layer-to-layer sticking within the roll during storage. When the composite material is to be used, the roll is gradually unwound and flattened onto a support surface (e.g. a vacuum table, conveyor, etc.), where individual pieces 104 of material are cut from the flat lamina into desired shapes for use in forming composite laminated parts. Those of skill in the art will be aware that there are various commercially available cutting machines and systems that are suitable for handling, unrolling and cutting carbon fiber composite materials from a composite lamina. For example, computer-controlled ultrasonic cutters, water jet cutters, and the like are well known and widely used for cutting composites and other materials.

As the roll is unwound, a two-ply layer or lamina of the composite material and its attached backing paper will be exposed. After the cutting machine cuts a piece 104 of the composite material from this lamina, the robotic arm 102 can grab the piece 104, such as via a vacuum plate 105 attached at the distal end of the robot arm 102, and transfer the cut piece 104 to a backing removal table 106, which is associated with the backing removal device 126. The backing removal table 106 provides a support surface for the cut piece of lamina 104 for the process that is described hereafter.

Figure 2:
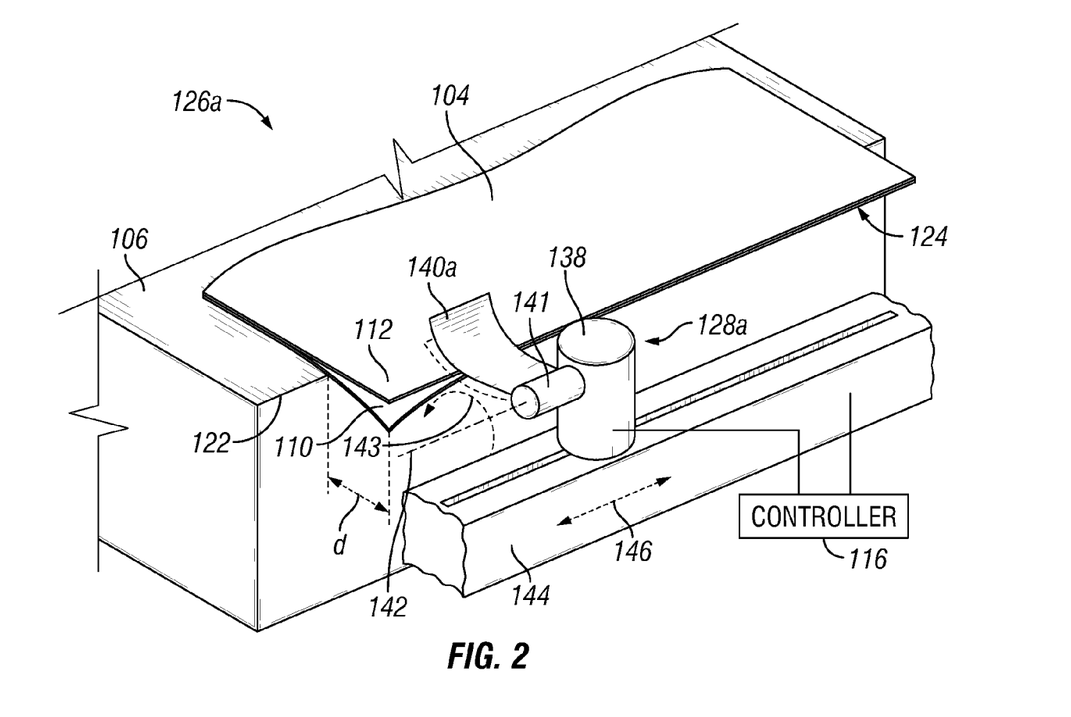
FIG. 2 is a close-up perspective view of the backing removal portion of the device of FIG. 1, showing an embodiment of a backing removal device having a rotating filament that moves upon a linear translation device.

Shown in FIG. 2 is a closer and more detailed view of one embodiment of a backing removal device 126 in accordance with this disclosure. As noted above, the lamina 104 of composite material is a two-ply lamina, which includes the composite material 110 and its attached backing paper 112. As depicted in FIG. 2, the lamina 104 is oriented with the composite material 110 facing down, and the backing film or backing paper 112 facing up. It is to be understood that the system and method disclosed herein is not limited to this orientation. That is, the system and method disclosed herein can be practiced with the lamina oriented with the backing paper 112 facing down and the composite ply 110 facing up. As will be appreciated by those of skill in the art, the single ply of composite material 110 is pre-impregnated with resin, and can be woven or unwoven, with unidirectional or multi-directional fibers, and it can be of various thicknesses.

Figure 5A:
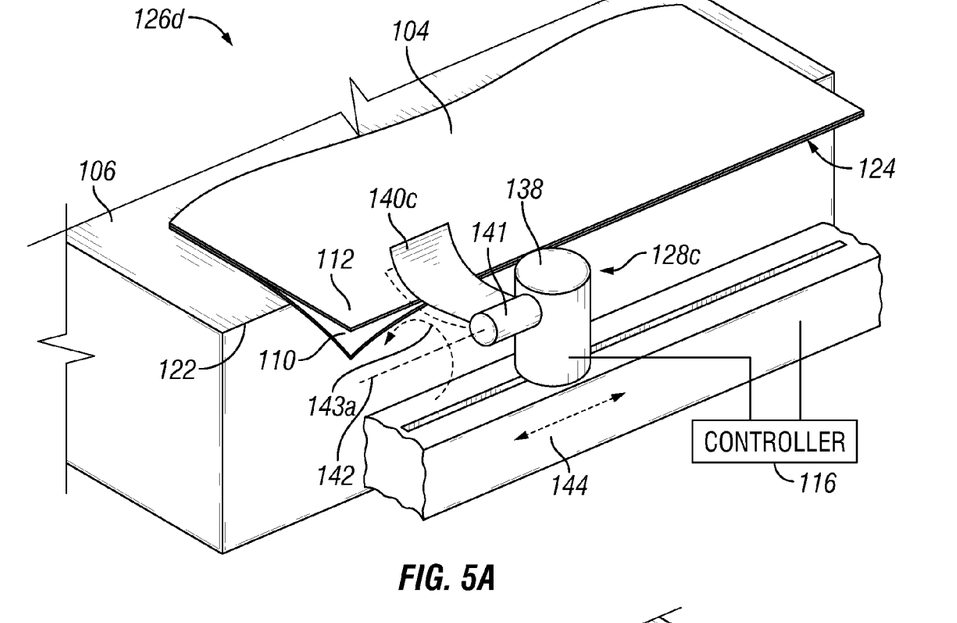
FIGS. 5A and 5B are close-up perspective views of an embodiment of a backing removal device having an oscillating filament that moves upon a translation device.
Figure 5B:
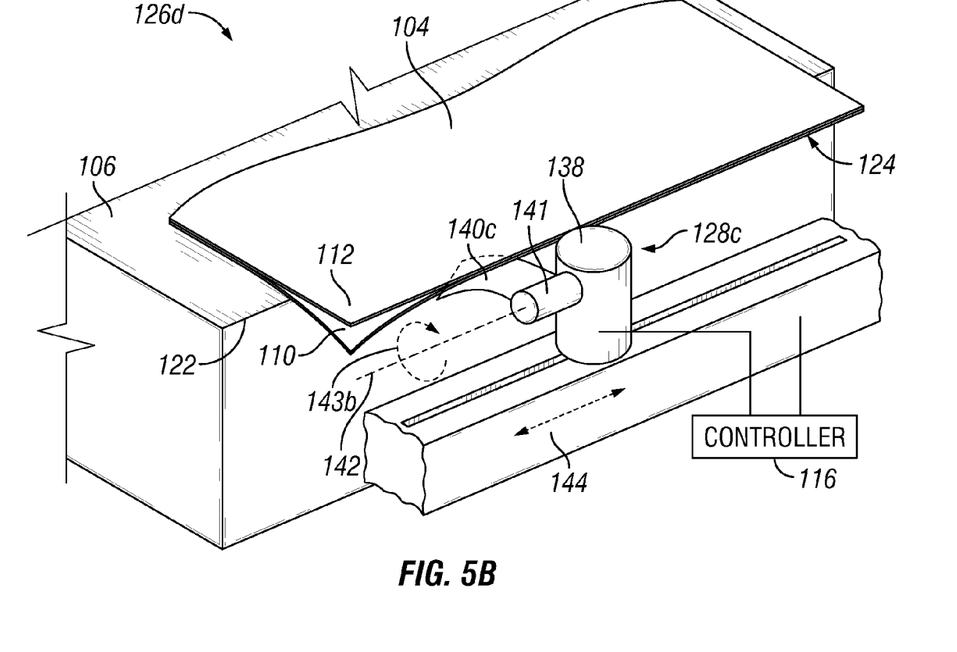
Figure 6A:
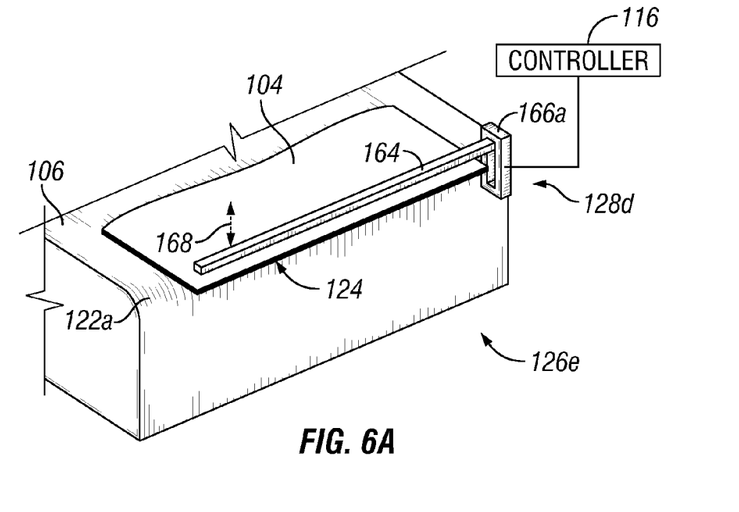
FIGS. 6A and 6B are close-up perspective views of an embodiment of a backing removal device having an elongate bar-type hammer.

As used herein, the terms "backing paper," "backing film" and "poly film" are used interchangeably to refer to the backing 112 that is provided on the composite lamina 104, whether this layer is actual paper, polymer, or some other material. After the cutting of a piece 104 from the composite material, the backing paper 112 is to be removed prior to subsequent steps. As noted above, the step of initial backing paper delamination has typically been performed with hand labor. Advantageously, the system and method disclosed herein provides an automated system for initial separation of the backing paper 112. As previously noted, the backing removal device 126 is positioned adjacent to the support table or support structure 106 that supports the cut piece of composite lamina 104. This support table 106 has an edge 122. In FIGS. 1-5 and 7-8 this edge is a relatively sharp, square edge. However, other edge configurations can also be used. For example, as shown in FIG. 6A, the edge of the support surface 106 can be a rounded edge 122a, which has a radius that can be selected to assist in the delamination process.

Referring to FIGS. 1 and 2, after an individual piece 104 of composite material is cut, the robotic arm 102 grasps and moves the piece 104 to the table 106, where an edge 124 of the piece 104 is advanced to the edge 122 of the support structure 106. The robotic arm 102 can hold and secure the piece 104 in place upon the support surface 106 with the exposed edge 124 of the composite lamina 104 extended some distance d over the edge 122. While the embodiment shown in FIG. 1 shows the robotic arm 102 as the device that secures the lamina 104 in place upon the support surface 106, it is to be appreciated that other devices can also be used to hold the lamina in place, such as clamps, vacuum devices, etc.

The overhang distance d can vary. It has been found that overhang distances in the range of 0 to about 1 inch are suitable. That is, the method disclosed herein can be practiced with the composite material not overhanging the edge 122 at all. However, other overhang values can also be used. For example, it is believed that overhang distances of up to about 6 inches can also be used. It has been found that a suitable overhang distance depends on the stiffness and thickness of the composite material 110, and other factors. The exposed edge 124 (or a corner) of the composite lamina 104 is made freely accessible and slightly overhanging, while keeping the rest of the lamina 104 fixed upon the support surface 106.

Disposed near the edge 122 of the support structure 106 is the backing removal device, indicated generally at 126, configured in accordance with the present disclosure. The backing removal device 126 includes an automated mechanical impactor, indicated generally at 128, which in various embodiments is configured to apply a mechanical impact to the overhanging exposed edge 124 of the composite lamina 104 to cause initial separation of the backing 112 from the composite ply 110. The automated mechanical impactor 128 is coupled to the controller 116, which controls the frequency, duration, and location of contact of the mechanical impactor 128 along the exposed edge 124. The impact force is selected to cause initial delamination of the backing film 112 near the exposed edge 124 of the composite lamina 104 without damaging the composite material 110.

The view of FIG. 2 shows one specific embodiment of a backing removal device 126a. This embodiment includes a mechanical impactor 128a that includes a hub or head 138 with a radially projecting shaft 141 and flexible filament, indicated generally at 140, and in this embodiment designated 140*a*. A motor (not shown) can be disposed within the hub 138, and configured to rotate the shaft 141. The size, shape, and composition of the filament 140*a* can vary. In one embodiment, the filament 140*a* is a section of high carbon steel, approximately ¾" wide and about 4" long and 0.02" thick. Other sizes and materials can also be used. For example, filaments of polymer (e.g. nylon) or other flexible materials can be used, and these can be wider or narrower, longer or shorter and thicker or thinner than the filament 140*a* shown in the figures. The flexibility of the filament can also vary. For example, filaments of steel having a modulus of elasticity around 200 GPa have been successfully used, as have filaments of nylon, having a modulus of elasticity of around 3 GPa. Filaments having a flexibility anywhere between these two values can be used, and it is believed that materials having flexibility characteristics outside this range can also be used. It will also be apparent that the flexibility of the filament is also dependent upon its thickness.

In the embodiment of FIG. 2, the shaft 141 on which the filament 140*a* is mounted rotates about an axis 142 that is substantially parallel to the exposed edge 124 of the composite lamina 104. When the filament 140*a* is rotated, it rotates in the direction of arrow 143 and repeatedly flaps against or strikes the lamina 104, striking the backing paper 112 that is adhered to the composite material 110 and face up in this view. Repeated contact of the filament 140*a* with the composite lamina 104 causes repetitive bending or out-of-plane vibration and deformation of the edge 124 of the composite lamina 104. This deformation of the composite lamina 104 initiates separation of the backing paper 112 from the pre-preg composite material 110.

In FIG. 2 the hub or head 138 is moveably mounted upon a linear translation device 144, configured to translate the head 138 along the exposed edge 124 while the mechanical impactor 128*a* is mechanically contacting the exposed edge 124. With this configuration, as the filament 140*a* rotates and contacts the composite lamina 104, the hub or head 138 translates down the length of the composite ply edge 124 in the direction of arrow 146, so that the impact force is applied sequentially to multiple discrete locations along the exposed edge 124. This action initiates separation of the backing paper 112 from the pre-preg composite material 110 along the length of the edge 124. After this initial separation, the piece of composite material 104 can be moved (e.g. by the robotic arm 102 of FIG. 1) to another automated apparatus that completes the removal of the backing 112. Devices for completing the backing removal are known in the art, and can include a vacuum roller or other mechanism that mechanically grips the backing 112 and pulls it off of the composite material 110. At that point the backing 112 can be discarded and the cut and exposed composite ply 110 can be placed wherever desired for its inclusion in a laminated part.

The impact force can be applied by the filament 140 in various ways. In one embodiment, the filament 140 is rotated in a single direction to repeatedly impact the composite lamina 104 at a frequency of anywhere from about 5 to about 10 Hz. It is believed that contact by the impacting device 128 at some frequency that is close to the natural or resonant frequency of the overhanging end 124 of the lamina 104 is effective. Naturally, this frequency can vary significantly from one situation to the next, and adjustment of the impact frequency can be desirable. The duration of the repetitive contact by the impacting device 128 can also vary. It has been found that contact at the above frequency in any one location of a composite ply for only a few seconds (e.g. less than 5 seconds) is generally sufficient to initiate delamination. It is believe that from 5 to 20 impacts at any given location along the exposed edge can be sufficient for any given composite material. Thus, the total duration of operation of the backing removal device 126 using the translating head embodiment of FIG. 2 will depend on the speed of translation of the hub 138, and the width of the exposed edge 124 of the composite lamina 104. However, it is to be noted that the geometry of the exposed edge 124, the frequency of the impact force and the duration of the impact force can be adjusted depending on a variety of factors, including the characteristics of the composite lamina, such as its thickness, fiber orientation, composition (e.g. woven, non-woven, aligned fibers, etc.) and the characteristics of the polymer resin that is impregnated within the composite material. Environmental factors, such as temperature, humidity, the age of the composite material 110, the thickness and nature of the backing material 112, and the shape of the exposed edge 124, can also affect the desired frequency and duration of impact that is effective to cause delamination of the backing 112.

Figure 3:
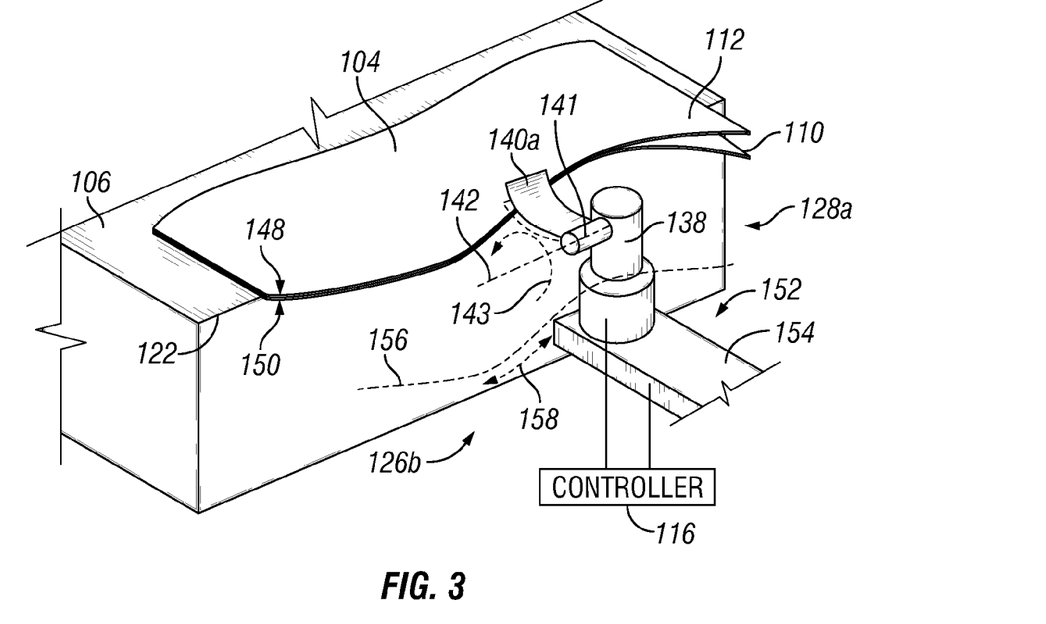
FIG. 3 is a close-up perspective view of an embodiment of a backing removal device having a rotating filament like that of FIG. 2, but which moves upon a non-linear translation device.

Shown in FIG. 3 is another embodiment of a backing removal device 126*b* that includes a hub or head 138 with a radially projecting flexible filament 140*a* that is rotatable on a shaft 141 about an axis 142 that is substantially parallel to an exposed and overhanging edge 148 of a composite lamina 104. As in the embodiment of FIG. 2, the filament 140*a* rotates in the direction of arrow 143, repeatedly striking the backing 112 that is face up on this view. In this embodiment, the exposed and overhanging edge 148 defines an irregular or non-linear shape, indicated at 150. Consequently, in this embodiment the hub 138 is mounted upon a non-linear translation device 152, which in this case is a robotic arm 154. Under control of the controller 116, the non-linear translation device 152 can move the rotating filament 140*a* along the exposed edge 148, as indicated by arrow 158, in a non-linear path, indicated by dashed line 156, that corresponds to the shape 150 of the exposed edge 148, so that the filament 140*a* can properly contact the entire extent of the exposed edge 148. It is to be appreciated that a robotic arm 154 is only one example of a non-linear translation device that can be used. Alternatively, a non-linear rail could be used, or a robot arm (e.g. robotic arm 102 in FIG. 1) could be used to hold and move the cut lamina 104, while the delamination device 126 remains stationary, for example. It is also to be appreciated that the various embodiments of translation devices shown herein can be interchanged with the various embodiments of delamination devices shown, and the disclosed invention is not limited to the combinations specifically shown.

Figure 4:
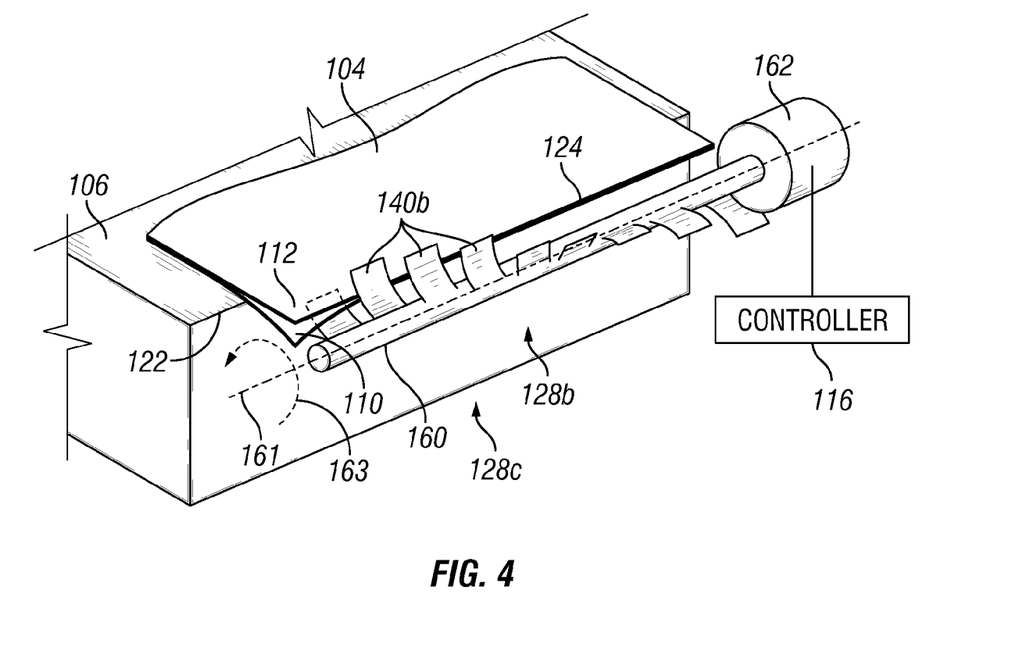
FIG. 4 is a close-up perspective view of an embodiment of a backing removal device having multiple rotating filaments that are disposed upon a common shaft.

Another embodiment of a backing removal device 126*c* is shown in FIG. 4. In this embodiment, the impactor 128*b* includes a plurality of filaments 140*b*, disposed upon a common actuating element, such as a rotatable shaft 160, positioned at least partly along an extent of the exposed edge 124 of the lamina 104. The multiple filaments 140*b* are disposed along the rotating shaft 160, which is powered by a motor 162 that is controlled by the controller 116, and which rotates the shaft 160 about a rotational axis 161 in the direction of arrow 163. The multiple flexible filaments 140*b* can be configured like the single filament 140*a* in the embodiments of FIGS. 2 and 3, but rotate together on the shaft 160 in a single direction to accomplish a similar effect. The position of the filaments 140*b* upon the shaft 160 can vary. In the embodiment of FIG. 4 the filaments 140*b* are arranged in a generally helical pattern, so that the impact force is applied sequentially to multiple discrete locations along the exposed edge 124 with each rotation of the shaft 160, but without the shaft 160 or any of the filaments 140*b* translating along the length of the edge 124. Alternatively, the filaments 140b can be arranged in other patterns along the shaft, such as a random pattern or in a single line, etc.

In the embodiments of FIGS. 2-4, the automated mechanical impactor 128 includes one or more rotating filaments 140, and the impact force is unidirectional. Alternatively, however, in these and other embodiments, the impact force can be an oscillatory or bidirectional force. Shown in FIGS. 5A and 5B are close-up perspective views of an embodiment of a backing removal device 126d that includes an impactor 128c mounted upon a linear translation device 144, like that of FIG. 2, in which the impactor 128c has an oscillating filament 140c, rather than a rotating filament. In this embodiment, the flexible filament 140c moves in one direction and then the other, and thus repeatedly contacts both sides (i.e. the side of the composite material 110 and the side of the backing film 112) of the exposed edge 124 of the composite lamina 104 with each oscillation.

As discussed above with respect to the embodiment of FIG. 2, the hub or head 138 can travel adjacent to the exposed edge 124 of the composite lamina 104 in either direction, so that the impact force is applied sequentially to multiple discrete locations along the exposed edge 124. However, with the oscillatory movement, the filament 140c is oscillated in a rapid flapping motion, which flicks the edge region of the backing paper 112 in one direction, and the edge region of the carbon fiber 110 in the opposite direction. Specifically, the filament 140c is attached to the rotating shaft 141, which oscillates about its rotational axis 142 first in one direction, indicated by arrow 143a in FIG. 5A, and then in the opposite direction, as indicated by arrow 143b in FIG. 5B. While in the embodiment of FIGS. 5A and 5B the hub 138 is attached to a linear translation device 144 and configured to traverse along a substantially straight exposed edge 124 of the composite lamina 104, it is to be appreciated that the hub 138 could alternatively be attached to a non-linear translation device, like the robotic arm 154 of FIG. 3, so that the impactor 128c can traverse adjacent to an irregular or non-linear exposed edge.

It is believed that all of the flexible filament embodiments disclosed herein can be configured with either a rotating filament or an oscillating filament. References to the use of either a rotating or oscillating filament, and to the application of either unidirectional or bidirectional force with a flexible filament can both be referred to as "flapping" against the edge of the composite lamina. For example, in one alternative embodiment, an array of multiple filaments can be disposed upon a single elongate shaft, like the embodiment of FIG. 4, and oscillated in a flapping motion like that discussed above with respect to the embodiment of FIGS. 5A and 5B. This configuration is not specifically shown in the figures, but represents a combination of the features of FIG. 4 with the features of FIGS. 5A and 5B. As discussed above with respect to FIG. 4, the position of the filaments on the elongate shaft can vary. For example, the filaments can be arranged in a generally helical pattern, a random pattern, a single line, etc. In this embodiment the oscillating impact force is thus applied to multiple discrete locations along the exposed edge with each oscillation of the bar, but without the bar or any of the filaments translating along the length of the exposed edge.

Another embodiment of an automated backing removal device 126e in accordance with this disclosure is shown in FIG. 6A. In this embodiment the mechanical impactor 128d includes an elongate bar or hammer 164, which is positioned adjacent to the exposed edge 124 and substantially parallel thereto. As with the other embodiments discussed above, in this embodiment the composite lamina is supported by a rigid surface 106 with the exposed edge 124 overhanging the rounded edge 122a of the support surface 106 a certain distance. The elongate hammer 164 is attached to a linear actuator 166a, and is configured to move up and down perpendicularly to the plane of the lamina 104 (i.e. in a vertical direction indicated by arrow 168 in FIG. 6A), thus rapidly and repeatedly striking the composite lamina 104, to substantially simultaneously impact the entire extent of the exposed edge 124. The bar or hammer 164 thus bends the cantilevered edge 124 in an abrupt motion, and this hammer effect and bending motion creates shear forces that act to separate the backing paper 112 from the composite material 110 at the edge 124.

In the embodiment of FIG. 6A, the repeated impact force is applied from one direction substantially simultaneously across the entire exposed edge 124, and causes the backing paper 112 to delaminate across the entire exposed edge 124, without translating any apparatus across or adjacent to the edge 124. Like the embodiments discussed above, the frequency of impact of the hammer 164a upon the lamina 104 can be in the range of 5-15 Hz, and the contact is effective with a duration of less than about 5 or 10 seconds.

Figures 6B, 6C:
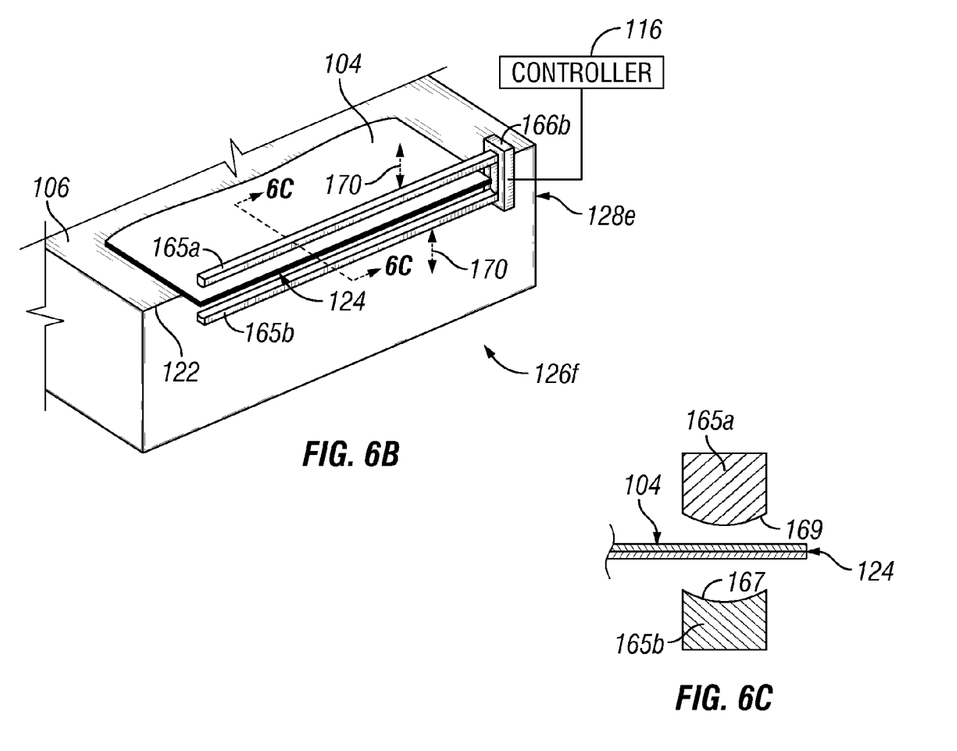
FIG. 6C is a cross-sectional view of the pair of elongate hammers depicted in FIG. 6B.

Shown in FIG. 6B is a close-up perspective view of another embodiment of a linear hammer-type backing removal device 126f. In this embodiment, the impactor 128e includes a pair of elongate bar-type hammers 165a, 165b, which are attached to a linear actuator 166b, one hammer 165a disposed above the overhanging exposed edge 124 of the lamina 104, and one hammer 165b below it. Again, the composite lamina 104 is supported by a rigid surface 106 with the exposed edge 124 cantilevered over the edge 122 of the support surface 106. Both bars 165a, b are aligned generally parallel to the edge 124, and are rapidly moved up and down (normal to the plane of the lamina, in the direction of arrows 170) to bend the cantilevered edge 124 in an abrupt motion. In this embodiment, the hammers are moved in an opposing reciprocating motion, and alternately come together and draw apart, like jaws that repeatedly clamp and release. However, the hammers can also be operated in other ways, such as alternately contacting the upper and lower surfaces of the lamina 104. Whichever type of motion is used, the hammer effect and bending motion creates shear forces that separate the backing paper 112 from the composite material 110 at the edge 124. As with the embodiment of FIG. 6A, the frequency of impact of the hammers 165 upon the lamina 104 can be in the range of 5-15 Hz, and the contact is effective with a duration of less than about 5 or 10 seconds.

The cross sectional shape of the hammers 165a, b can be selected in order to affect the efficiency of separation. This feature is shown in the cross-sectional view of FIG. 6C. In this view it can be seen that the contacting surface 169 of the upper hammer 165a has a convex shape, while the contacting surface 167 of the lower hammer 165b has a concave shape. The two curved contacting surfaces can have comparable radii, in order to increase the clamping effect of the hammers 165 and slightly bend the lamina 104 to generate more shear force.

Figure 7:
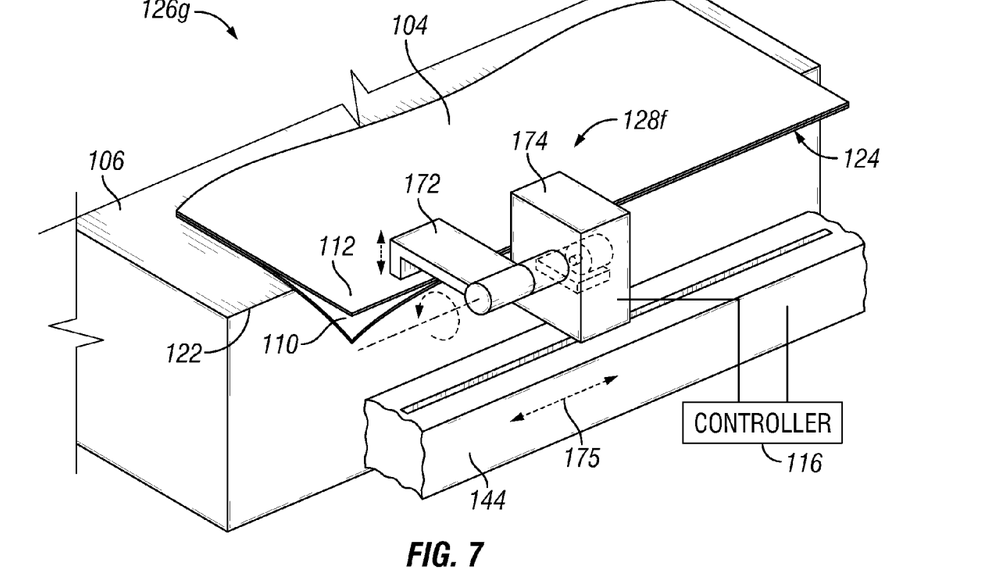
FIG. 7 is a close-up perspective view of an embodiment of a backing removal device having a reciprocating hammer that moves upon a translation device.

Provided in FIG. 7 is a close-up perspective view of another embodiment of a backing removal device 126g. This configuration includes an impactor 128f having a reciprocating hammer 172 that moves upon a linear translation device 144 adjacent to the exposed edge 124 of the lamina 104. The hammer 172 moves in an oscillating or reciprocating motion above the side of the lamina 104 facing the backing paper 112, and is powered by a motorized cam device 174 or the like, to impinge the backing paper 112 locally. The reciprocating hammer 172 is configured to travel along the exposed edge 124, as indicated by arrows 175, while repeatedly mechanically impacting one side of the composite lamina 104 in a unidirectional motion at a series of locations. The oscillating impact causes a local hammering effect to separate the backing paper 112 from the composite material 110 without touching the carbon fibers.

Figure 8A:
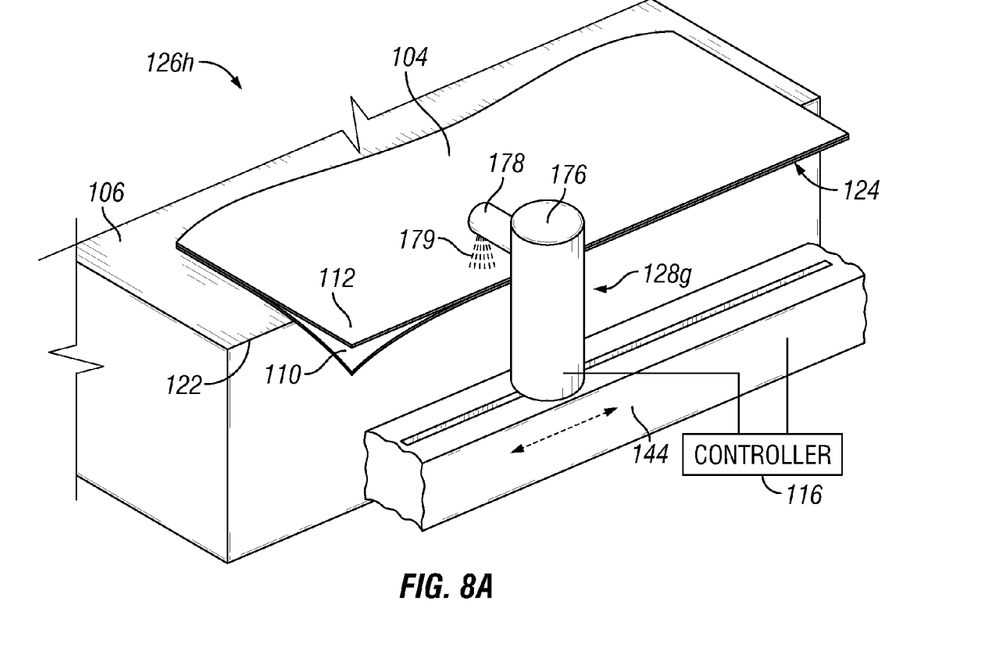
FIG. 8A is a close-up perspective view of an embodiment of a backing removal device having an air jet device that moves upon a translation device.

Another embodiment of a backing removal device 126h is shown in FIG. 8A. In this embodiment the automated mechanical impactor 128g includes an air jet device 176, configured to apply an impact force to the composite lamina 104 with a jet of compressed air. The air jet device 176 includes an air jet nozzle 178, oriented toward the exposed upper surface of the edge 124 of the composite lamina. The air jet device 176 is mounted upon a linear translation device 144, which allows the air jet device 176 to travel adjacent to the edge 124 of the lamina, and apply a single jet 179 of air against one side of the composite lamina 104 with rapidly oscillating pressure. This allows the impact force to be applied sequentially to multiple discrete locations along the exposed edge 124. It is to be understood that the air jet device 176 can alternatively be mounted on a non-linear translation device, like that of FIG. 3. The jet 179 of air is aimed substantially perpendicularly at the side of the lamina 104 having the backing paper 112, and induces a bending motion and stress in the composite lamina 104 that creates shear forces to separate the backing paper 112 from the composite material 110 at the edge 124. The air jet's pressure, flow rate, frequency of oscillation, and distance from the backing are selected to cause initial delamination of the backing film 112 near the exposed edge 124 of the composite lamina 104, without damaging the composite material 110. One of skill in the art will be able to set these variables for any given situation.

Figure 8B:
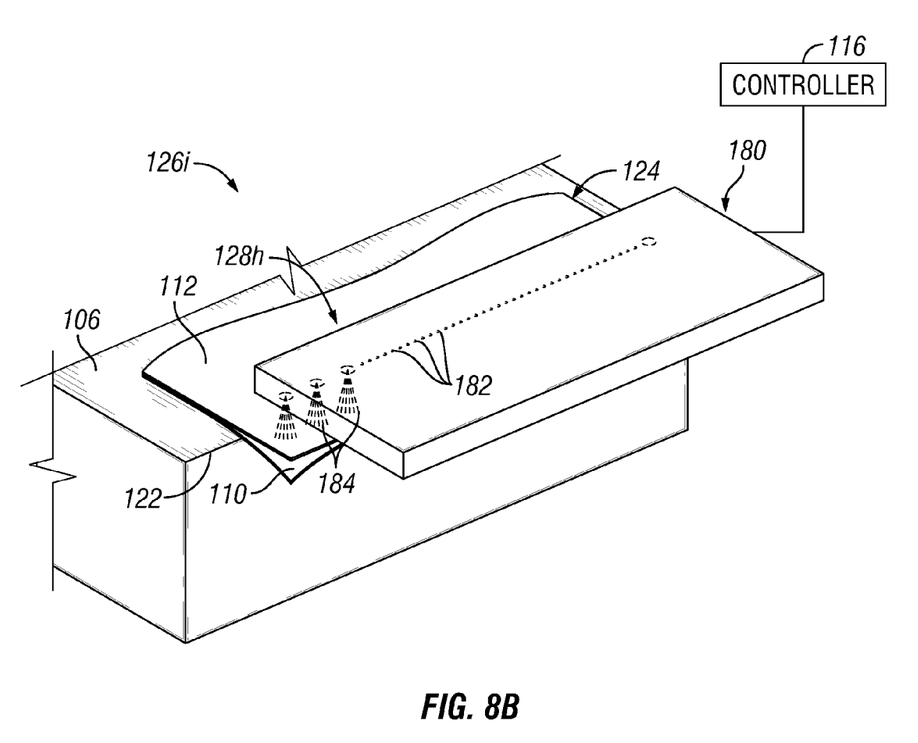
FIG. 8B is a close-up perspective view of an embodiment of a backing removal device having an air jet device that includes multiple air jet outlets disposed in substantial alignment with the edge of the composite lamina.

Another embodiment of a backing removal device 126i that uses an air jet is shown in FIG. 8B. In this embodiment, an elongate air jet head 180 is provided, and is positioned to overhang the exposed edge 124 of the composite lamina 104. This elongate air jet head 180 includes multiple air jet outlets or nozzles 182, which are arranged in substantial alignment with the edge 124 of the composite lamina 104. The jets 184 of air from these nozzles 182 are aimed substantially perpendicularly at the exposed upper surface of the lamina 104, and induce bending stress in the composite lamina 104 that creates shear forces to separate the backing paper 112 from the composite material 110 at the edge 124. With this configuration, a discrete jet 184 of air can be applied independently at multiple locations against one side of the composite lamina 104 with rapidly oscillating pressure. This allows the impact force to be applied sequentially to multiple discrete locations along the exposed edge 124, but without moving any apparatus along the exposed edge 124. Instead, the elongate air jet head 180 remains stationary, while the air jet nozzles 182 are actuated in any desired sequence to provide a jet 184 of air upon the lamina 104 at any given location. For example the air jets 184 can be actuated one at a time in a linear sequence. Alternatively, the air jets 184 can be actuated all at once, or in some other sequence.

The system and method disclosed herein thus allows for initial separation of an adhered backing film from a pre-impregnated composite lamina having an edge. The method includes exposing and supporting the edge of the composite lamina, applying an impact force to the exposed edge with an automated tool, and separating the backing film from the exposed edge of the base lamina. In this process, the composite lamina can be supported on the support structure with a free edge of the composite lamina exposed and overhanging the edge of the removal device. The free edge can be generally straight, or it can be curved or irregular, and the impactor can be configured to follow the shape of the free edge. The impact force can be a unidirectional or bidirectional impact force. As noted above, in various embodiments the automated tool for applying the impact force can be a rotating or oscillating filament, multiple rotating or oscillating filaments, an impacting bar or hammer, or an air jet. Other devices can also be used for providing an impact force against the edge region of a composite lamina at a magnitude and frequency that is sufficient to bend or deflect the exposed edge and thereby cause delamination of an edge portion of the backing film from the composite lamina without damaging the composite material.

Automating this initial separation process can enable total automation of the placement and handling of composite plies, which can speed production, reduce contamination and other defects, and reduce labor and costs associated with composite manufacturing processes.

It is believed that the method and apparatus disclosed herein can be utilized by any entity that handles pre-preg composite materials, such as manufacturers of commercial and military aircraft, aircraft engines, wind turbines, automobiles, sporting goods, etc. This system and method can help enable full automation of backing paper removal when handling composite pre-preg plies. Full automation can reduce production time and costs by reducing the manual labor otherwise involved in many types of composite manufacturing. The working principle of this system and method can also be applied to other processes, such as delamination inspection, paint removal and removal of peel plies on thin sheet metal.

Figure 9:
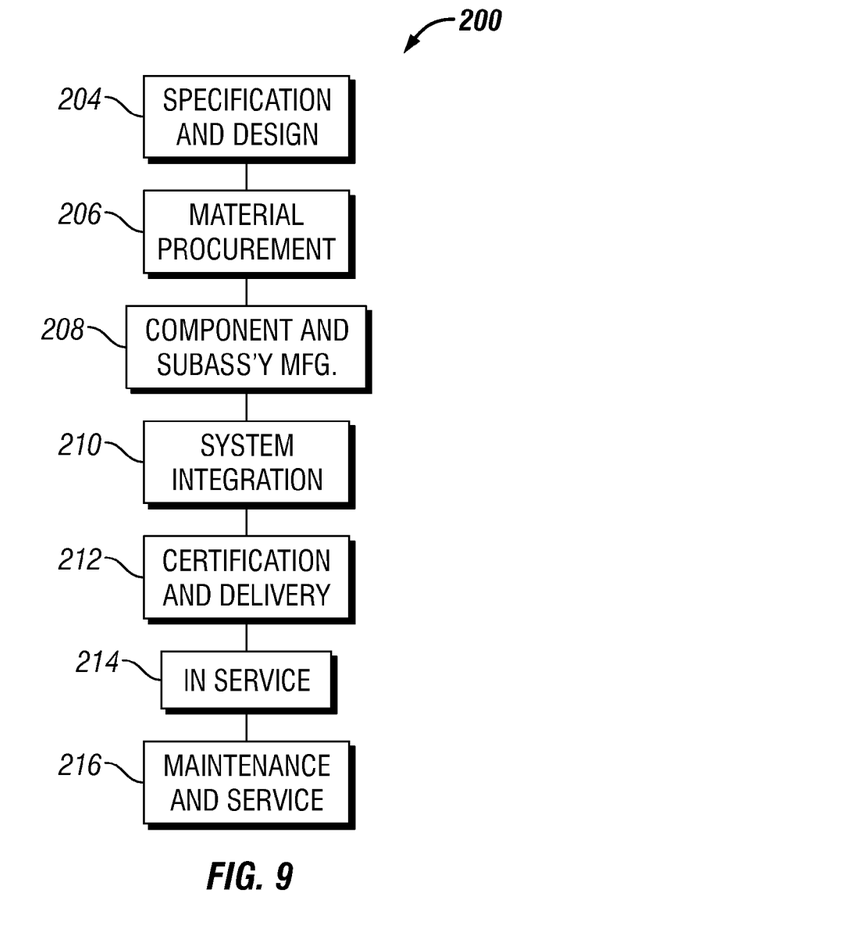
FIG. 9 is a flow diagram of aircraft production and service methodology.
Figure 10:
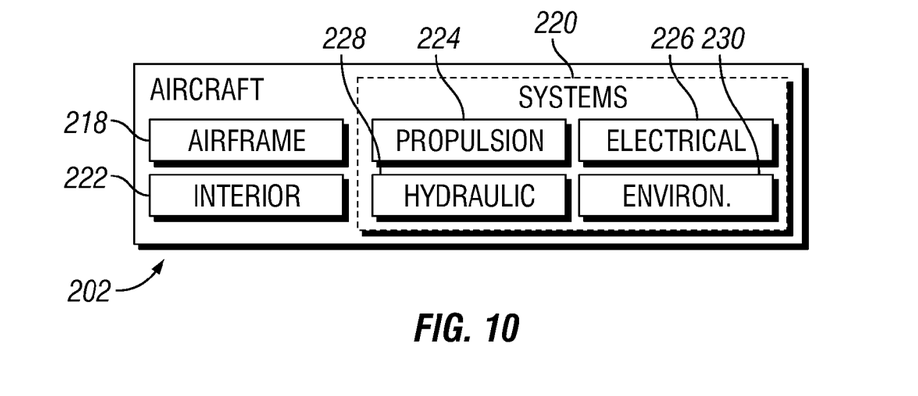
FIG. 10 is a block diagram of an aircraft.

Embodiments of the disclosure may be described in the context of an aircraft manufacturing and service method 200 as shown in FIG. 9 and an aircraft 202 as shown in FIG. 10. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Although various embodiments have been shown and described, the present disclosure is not so limited and will be understood to include all such modifications and variations are would be apparent to one skilled in the art.

What is claimed is:

1. A method for initial separation of an adhered backing film from a pre-impregnated, uncured composite lamina having a free edge, comprising:
    exposing and supporting the free edge of the composite lamina; and
    applying an impact force to the exposed free edge with an automated tool, the impact force sufficient to cause delamination of the backing film from the composite lamina without damaging the lamina, wherein the impact force is applied with a rotating or oscillating filament.

2. A method in accordance with claim 1, wherein the impact force is unidirectional.

3. A method in accordance with claim 1, wherein the impact force is an oscillatory, bidirectional force, contacting both a composite ply side and a backing film side of the composite lamina.

4. A method in accordance with claim 1, wherein the impact force is applied at a frequency of about 5-10 Hz and for a duration of less than 5 seconds.

5. A method in accordance with claim 1, wherein the impact force includes from 5 to 20 impacts upon the exposed free edge.

6. A method in accordance with claim 1, wherein the impact force is applied sequentially to discrete locations along the exposed free edge.

7. A method in accordance with claim 1, wherein the impact force is applied substantially simultaneously across the entire exposed free edge.

8. A method in accordance with claim 1, further comprising adjusting at least one of a frequency of the impact force and a duration of the impact.

9. A method for initial separation of an adhered backing film from a pre-impregnated composite lamina, comprising:
    placing a pre-impregnated composite lamina having a backing film upon an automated removal device having an edge;
    supporting the composite lamina in the removal device with a free edge of the composite lamina exposed and overhanging the edge of the removal device; and
    activating the removal device to impose a unidirectional or bidirectional impact force to the exposed free edge of the composite lamina, the impact force being sufficient to deflect the exposed edge and cause delamination of an edge portion of the backing film from the composite lamina without damaging the lamina, wherein the impact force is applied with a rotating or oscillating filament.

10. A method in accordance with claim 9, wherein the impact force is applied at a frequency of about 5-10 Hz and for a duration of less than 5 seconds.

11. A method in accordance with claim 9, wherein the impact force is applied sequentially to discrete locations along the exposed free edge.

12. A method in accordance with claim 9, wherein the impact force is applied substantially simultaneously across the entire exposed free edge.

13. A method in accordance with claim 9, wherein the composite lamina overhangs the edge of the removal device a distance of from 0 to about 6 inches.

14. A system for initial separation of an adhered backing film from a pre-impregnated composite lamina, comprising:
    a support structure for the composite lamina, the support structure having an edge;
    an automated mechanical impactor, disposed near the edge of the support structure, adapted to apply a mechanical impact force to an exposed free edge of a pre-impregnated composite lamina overhanging the edge of the support structure; and
    a controller, coupled to the mechanical impactor, configured to control a frequency, duration, and location of contact of the mechanical impactor along the exposed edge, whereby the impact force causes initial delamination of the backing film near the exposed edge of the composite lamina without damaging the lamina, wherein the automated mechanical impactor comprises a rotating or oscillating filament, configured to contact the exposed free edge with each rotation or oscillation.

15. A system in accordance with claim 14, wherein the rotating or oscillating filament comprises a plurality of filaments, disposed upon a common actuating element, positioned at least partly along an extent of the exposed free edge.

16. A system in accordance with claim 14, further comprising a translation device, configured to translate the automated mechanical impactor along the exposed free edge while the mechanical impactor is mechanically impacting the exposed free edge.

17. A system in accordance with claim 16, wherein the translation device is configured to translate the automated mechanical impactor along the exposed free edge in a non-linear path.

18. A system in accordance with claim 14, wherein the automated mechanical impactor comprises an elongate hammer, disposed at least partly along an extent of the exposed free edge and substantially parallel thereto, configured to substantially simultaneously impact the extent of the exposed free edge.

\* \* \* \* \*